US008361948B2

(12) United States Patent
Li et al.

(10) Patent No.: US 8,361,948 B2
(45) Date of Patent: Jan. 29, 2013

(54) PAINT STRIPPER

(75) Inventors: Chang-De Li, KunShan (CN);
Huang-Jin Lv, KunShan (CN);
Sheng-Liang Dai, KunShan (CN)

(73) Assignees: Furui Precise Component (Kunshan) Co., Ltd., Kunshan (CN); Foxconn Technology Co., Ltd., New Taipei (TW)

( * ) Notice: Subject to any disclaimer, the term of this patent is extended or adjusted under 35 U.S.C. 154(b) by 0 days.

(21) Appl. No.: 13/204,725

(22) Filed: Aug. 8, 2011

(65) Prior Publication Data

US 2012/0316096 A1 Dec. 13, 2012

(30) Foreign Application Priority Data

Jun. 9, 2011 (CN) .......................... 2011 1 0153160

(51) Int. Cl.
*C11D 7/50* (2006.01)
(52) U.S. Cl. ........................................ 510/210; 252/364
(58) Field of Classification Search .................. 510/210; 252/144, 166, 167, 170
See application file for complete search history.

(56) References Cited

U.S. PATENT DOCUMENTS

| 3,574,123 | A | * | 4/1971 | Laugle | 510/205 |
|---|---|---|---|---|---|
| 4,246,130 | A | * | 1/1981 | Koch | 510/202 |
| 4,426,311 | A | * | 1/1984 | Vander Mey | 134/1 |
| 4,812,255 | A | * | 3/1989 | Suwala | 134/38 |
| 5,015,410 | A | * | 5/1991 | Sullivan | 510/208 |
| 5,518,661 | A | * | 5/1996 | Langford et al. | 252/364 |
| 2007/0155644 | A1 | * | 7/2007 | Muse, Jr. | 510/407 |

FOREIGN PATENT DOCUMENTS

DE  3239016  * 10/1982

* cited by examiner

*Primary Examiner* — Liam Heincer
*Assistant Examiner* — M. Reza Asdjodi
(74) *Attorney, Agent, or Firm* — Altis Law Group, Inc.

(57) ABSTRACT

A paint stripper composition includes from about 70 to about 76 percent by volume of methylene chloride, from about 10 to about 14 percent by volume of isopropanol, from about 5 to about 8 percent by volume of formic acid, from about 1.5 to about 2.5 percent by volume of OP-10, from about 1 to about 2.5 percent by volume of phenol, and from about 2 to about 4 percent by volume of ozocerite, based upon 100 percent by volume of the total composition.

8 Claims, No Drawings

PAINT STRIPPER

BACKGROUND

1. Technical Field

The present disclosure relates to paint strippers and, more particularly, to an efficient and comparatively less toxic and more environmentally friendly paint stripper.

2. Description of Related Art

When stripping coatings such as paint substrates, it is necessary to use strong acids or halocarbon compositions. However, the efficiency is low, and these compositions are highly toxic and hazardous to the environment.

Therefore, what is needed is a paint stripper, which can overcome the above described shortcomings

DETAILED DESCRIPTION

An exemplary embodiment of a paint stripper includes methylene chloride, isopropanol, formic acid, Alkylphenols polyoxyethylene (OP-10), phenol and ozocerite. In the present embodiment, the paint stripper includes a mixture of about 70 to 76 percent by volume of methylene chloride, about 10 to 14 percent by volume of isopropanol, about 5 to 8 percent by volume of formic acid, about 1.5 to 2.5 percent by volume of OP-10, about 1 to 2.5 percent by volume of phenol, and about 2 about 4 percent by volume of ozocerite, based upon 100 percent by volume of the total composition.

In one or more embodiments, the methylene chloride is about 72 percent by volume, 73 percent by volume, or 75 percent by volume. The isopropanol is about 11 percent by volume, 12 percent by volume, or 13 percent by volume. The formic acid is about 6 percent by volume, 6.5 percent by volume, or 7 percent by volume. The OP-10 is about 1.8 percent by volume, 2 percent by volume, or 2.3 percent by volume. The phenol is about 1.5 percent by volume, 1.2 percent by volume, or 2.2 percent by volume. The ozocerite is about 2.7 percent by volume, 3 percent by volume, or 3.5 percent by volume.

The paint stripper easily strips paint from surfaces of workpieces, such as sub-gloss paint that may be coated on heat pipes. By experimentation it was found that the paint stripper can strip a 20 micron to 25 micron thick coat of modified epoxy resin paint in about 8 to 10 seconds and a 20 micron to 30 micron thick coat in about 9 to 13 seconds. Therefore, the paint stripper is efficient, while being relatively less toxic to humans and less hazardous to the environment.

While certain embodiments have been described and exemplified above, various other embodiments from the foregoing disclosure will be apparent to those skilled in the art. The present invention is not limited to the particular embodiments described and exemplified, but is capable of considerable variation and modification without departure from the scope and spirit of the appended claims.

What is claimed is:

1. A composition consisting of: methylene chloride, isopropanol, formic acid, Alkylphenols polyoxyethylene (OP-10), phenol and ozocerite, wherein the volume composition of methylene chloride ranges from 70 to 76 percent, the volume composition of isopropanol ranges from 10 to 14 percent, the volume composition of formic acid ranges from 5 to 8 percent, the volume composition of OP-10 ranges from 1.5 to 2.5 percent, the volume composition of phenol ranges from 1 to 2.5 percent, and the volume composition of ozocerite ranges from 2 to 4 percent.

2. The composition of claim 1, wherein the composition consists of 75 percent by volume of methylene chloride, 13 percent by volume of isopropanol, 6 percent by volume of formic acid, 2 percent by volume of OP-10, 2 percent by volume of phenol, and 2 percent by volume of ozocerite.

3. The composition of claim 1, wherein the composition is used for strip sub-gloss paint.

4. The composition of claim 1, wherein the composition is used for strip sub-gloss paint coating on heat pipes.

5. A paint stripper composition consisting of:
   methylene chloride of 70~76 percent by volume;
   isopropanol of 10~14 percent by volume;
   formic acid of 5~8 percent by volume;
   OP-10 of 1.5~2.5 percent by volume;
   phenol of 1~2.5 percent by volume; and
   ozocerite of 2~4 percent by volume.

6. The paint stripper composition of claim 5, wherein the composition consists of about 75 percent by volume of methylene chloride, about 13 percent by volume of isopropanol, about 6 percent by volume of formic acid, about 2 percent by volume of OP-10, about 2 percent by volume of phenol, and about 2 percent by volume of ozocerite.

7. The paint stripper composition of claim 5, wherein the composition is used for strip sub-gloss paint.

8. The paint stripper composition of claim 5, wherein the composition is used for strip sub-gloss paint coating on heat pipes.

* * * * *